(12) United States Patent
Mcinnes et al.

(10) Patent No.: US 7,251,038 B2
(45) Date of Patent: Jul. 31, 2007

(54) LIGHT SOURCE STABILISATION

(75) Inventors: James Mcinnes, Winchester (GB);
Maxwell R. Hadley, Lyndhurst (GB);
Arthur H. Hartog, Southampton (GB);
Yuehua Chen, Reading (GB); Timothy Jeffreys, Winchester (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 383 days.

(21) Appl. No.: 10/514,864

(22) PCT Filed: May 13, 2003

(86) PCT No.: PCT/GB03/02045
§ 371 (c)(1),
(2), (4) Date: Nov. 15, 2004

(87) PCT Pub. No.: WO03/098157
PCT Pub. Date: Nov. 27, 2003

(65) Prior Publication Data
US 2005/0200855 A1    Sep. 15, 2005

(30) Foreign Application Priority Data
May 17, 2002    (GB) ................................. 0211388.4

(51) Int. Cl.
*G01B 9/02*    (2006.01)

(52) U.S. Cl. ..................... 356/479; 356/35.5

(58) Field of Classification Search .................. 356/32, 356/35.5, 477, 479, 497; 385/12; 250/227.19, 250/227.27
See application file for complete search history.

(56) References Cited

U.S. PATENT DOCUMENTS 5,963,321 A * 10/1999 Wang .......................... 356/519

* cited by examiner

*Primary Examiner*—Tarifur Chowdhury
*Assistant Examiner*—Marissa J. Detschel
(74) *Attorney, Agent, or Firm*—Osha Liang; Dona C. Edwards; Bryan P. Galloway

(57) ABSTRACT

An apparatus for sensing data from a remote optical sensor 16 has its frequency stabilised by balancing the outputs of narrow band filter 28 30, spaced about a desired frequency 36 positioned at about the 3 db down points 40 of a broad band light source 10 using voltage control, current control or temperature control to vary the frequency of the wide band light source 10. Difference between the outputs through the two narrow band filters 28 30 can be used to drive an amplifier 48 to correct the frequency of the broad band light source. The outputs through the two narrow band filters 28 30 can be converted 52 to binary numbers and fed to a microprocessor 56 which is used, via analog conversion 60, to drive the amplifier 48. The broad band light source 10 can be pulse modulated 68 to provide temporally separate light pulses 92 94 through each of the narrow band filters 28 30, measured at separate times. The corrective output to the amplifier 48 can be governed by a ratio between the outputs through the narrow band filters 28 30 rather than by a difference there between.

28 Claims, 6 Drawing Sheets

LIGHT SOURCE STABILISATION

The present invention relates to remote monitoring of a parameter which is encoded by means of the parameter or parameters varying the dimensions of a dual path light cell (interferometer). It particularly relates to temperature, flow rate, chemical property, strain or pressure measurement using light, sent to and returned from an interferometric transducer at the end of a fibre optic line.

The present invention most particularly relates to a method and apparatus where the broadband light is sent, via the fibre optic line, to and from the transducer, the return light being subject to a first intensity measurement in broadband and subjected to a second intensity measurement after it has been subjected to narrow bandwidth filtering, the ratio of the two measurements giving a measure of the interferometer path difference and thus of the measured temperature, flow rate, chemical property, strain or pressure. The invention concerns improvements to such a measurement system and is applicable to, but not exclusively, for example, pressure, flow rate, chemical property, strain or temperature measurements in a hydrocarbon well or like hostile and inaccessible environment.

The prior art includes a first type of signal processing where the path imbalance occasioned by the interferometer is determined by submitting the signal from the sensor to a second (interrogating) interferometer, the path imbalance of which can be adjusted. By sweeping the interrogating interferometer over the range of path imbalances which can be exhibited by the sensor, a cross-correlation between the modulations of the source spectrum applied by the two interferometers is obtained and, from this and detailed knowledge of the position of the interrogating interferometer, the position of the sensing interferometer can be deduced, often with a high degree of resolution and absolute accuracy. Specific implementations include mechanically scanned interferometers. Electronically scanned interferometers have been implemented by splitting the incoming optical signal from the sensor with a wedge and applying the resulting Fizeau fringes to a CCD Charge coupled device array or similar linear image sensor (U.S. Pat. Nos. 5,202,939 and 5,392,117). There are many variations on these basic principles in the literature.

The benefits of recovering the interferometer position by some form of matched interferometer are that a wide dynamic range can be achieved since in most configurations the transducer can vary the optical path difference by more than one fringe. In addition, the information is spread over the entire spectrum of the source and it follows that the method is robust to variations in the spectral attenuation of the fibre connecting the sensor to the opto-electronic unit (the down lead). However, the stability of the recovery interferometer is then critical to the accuracy of the measurement and ensuring adequate stability against changes in temperature and mechanical drift can result in an expensive readout system. In the case of electronically scanned interrogating interferometers, the range of low-cost, line imaging devices usually restricts operation to wavelengths shorter than 1000 nm. As a result, the fibre losses at the operating wavelength are increased, which precludes operation over distances of many km, a requirement, for example, in the oil industry.

The exact style of the transducer is not the subject of the present invention. The present invention can function with any style of optical transducer adapted to provide output indicative of the value of any parameter.

The present invention seeks to provide ways to improve the stability and accuracy of measurement using fibre optic transducers, including interferometric transducers. For instance in order to ensure the accuracy of the measurements over time it is important that the central wavelength of the broad band source is stable relative to the narrow band filter. If it is not stable then any ratio used to calculate the measurand can drift independently of the actual transducer measurement.

The present invention seeks to provide means for stabilising drift of the centre frequency of a broad band light source.

In a first aspect, the present invention consists of an apparatus for processing signals from a remote optic sensor, said apparatus including means for supplying a broad band light beam for use in interrogating the optic sensor, said apparatus comprising: a first narrow band filter and a second narrow band filter, said first and second filters having respective centre frequencies spaced about the desired centre frequency of the broad band light source; coupling means for coupling a first sample of said broad band light beam through said first narrow band filter and a second sample of said broad band light beam through said second narrow band filter; first means to measure the filtered first sample of said broad band light beam; second means to measure the filtered second sample of said broad band light beam; comparison means to compare the outputs of said first means and said second means and to produce an error indication in response thereto; means to employ said error indication to apply a correction to said means to produce said broad band light beam to move the central frequency of said broad band light beam towards said desired centre frequency.

The invention further provides that the central frequency of the broad band light beam may be moved into coincidence with said desired central frequency.

The invention further provides that the error signal can be a difference signal.

The invention further provides that the comparison means can be operative to take the ratio between the output of the first means to measure and the output of the second means to measure, and to generate a corrective output error indication if the ratio changes.

The invention further provides that moving the centre frequency of the broad band beam includes controlling the current through the means for supplying a broad band light beam.

The invention further provides that moving the centre frequency of the broad band beam includes controlling voltage applied to the means for supplying a broad band light beam.

The invention further provides that moving the centre frequency of the broad band beam includes controlling the temperature of the means for supplying a broad band light beam.

The invention further provides that the broad band light beam can provide illumination for an optical sensor on the distal end of a fibre optic line in a hydrocarbon well.

The invention further provides that the optical sensor can be a pressure, flow rate, temperature, chemical property, or strain sensor.

The invention further provides that the means to supply a broad band light beam can be substantially temporally continuous and that the first and second means to measure are also temporally continuous.

The invention further provides that the means to supply a broad band light beam can be substantially temporally discontinuous and that the first and second means to measure are operative to measure only when the first and second samples of the broad band light beam respectively are present for measurement.

The invention provides that the first and second means to measure comprise a single measurement path and means temporally to separate measurement activity for said first filtered sample and for said second filtered sample.

The invention further provides that the first narrow band filter comprises a first narrow band reflector, and said second narrow band filter comprises a second narrow band reflector, said first and second narrow band reflectors being separated by a delay line, for said first filtered sample and said second filtered sample temporally to be separated.

The invention further provides that a means for coupling first and second samples of said broad band light beam can be a broadband reflector, and the measured samples are the pulses being reflected by the narrowband reflectors from the broadband reflector.

In a second aspect, the present invention consists of a method for stabilizing the broad band light source of system used for processing signals from a remote optic sensor, including the steps of: supplying a broad band light beam for use in interrogating the optic sensor; providing a first narrow band filter and a second narrow band filter, said first and second filters having respective centre frequencies spaced about the desired centre frequency of the broad band light source; coupling a first sample of said broad band light beam through said first narrow band filter and a second sample of said broad band light beam through said second narrow band filter; measuring the filtered first sample of said broad band light beam; measuring the filtered second sample of said broad band light beam; comparing the outputs of said first sample and said second sample; producing an error indication in response thereto; moving the central frequency of the broad band light beam towards the desired centre frequency means as a result of the error indication.

The invention is further explained, by way of example, by the following description, taken in conjunction with the appended drawings, in which.

Figure 5:
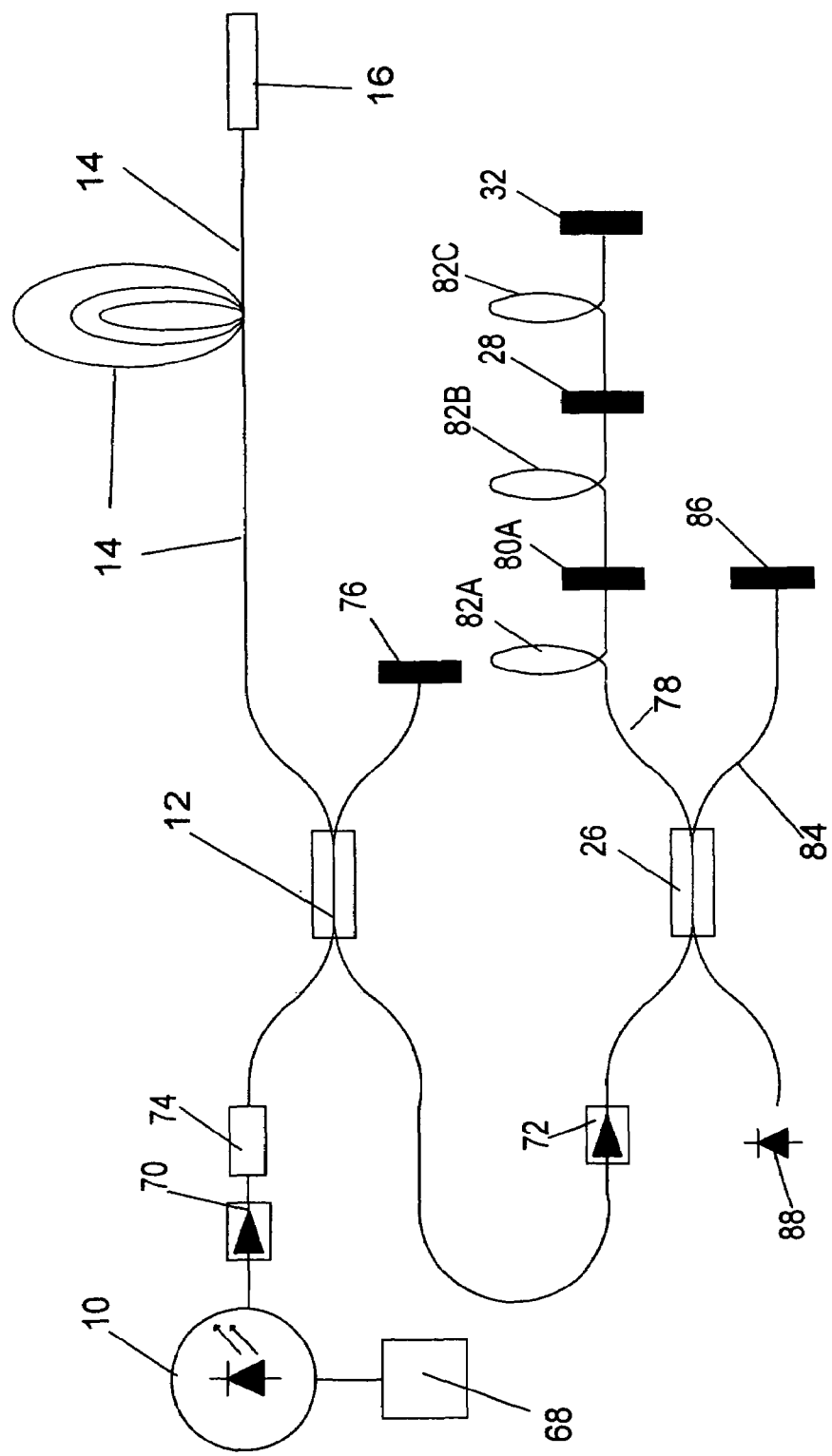
FIG. 5 is a schematic diagram of an apparatus, constructed according to a second embodiment of the present invention employing a pulses broad band light source.
Figure 7:
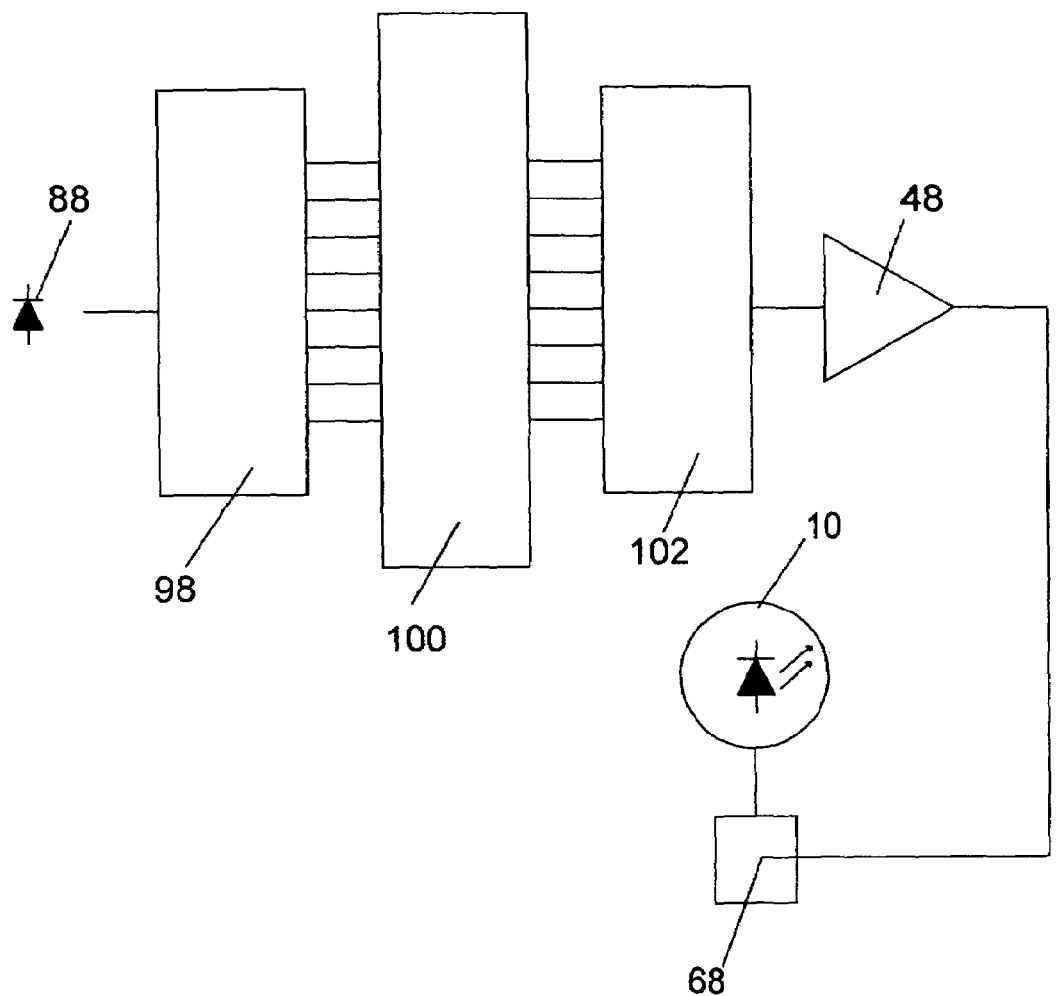
Figure 8:
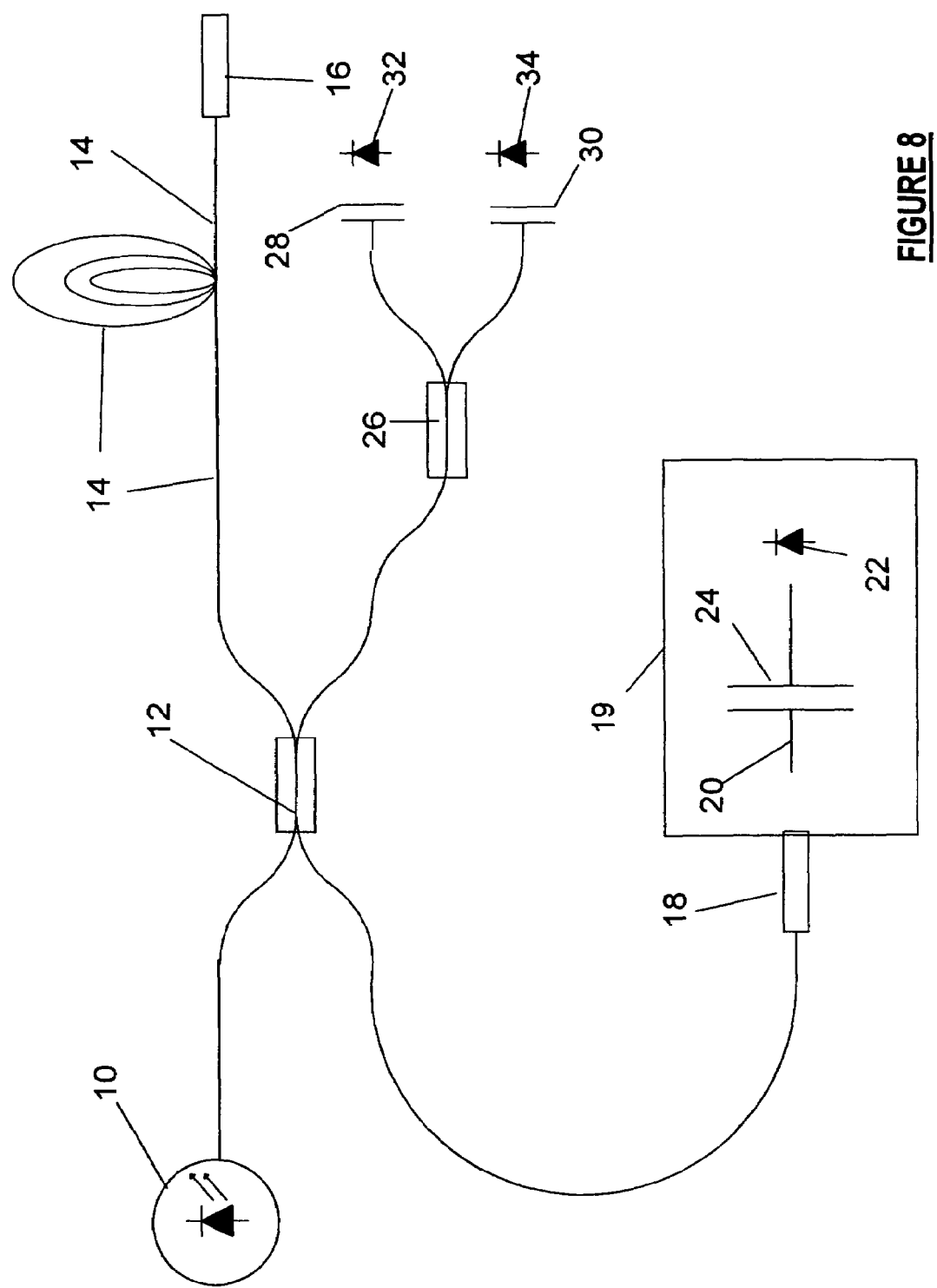

FIG. 7 is a block diagram of the apparatus used in the embodiment of FIG. 5 to generate an error signal from the single photo detector and further illustrates one method of controlling the centre frequency of the pulsed broad band light source. And FIG. 8 is a schematic diagram of an apparatus, constructed according to a first embodiment of the present invention employing a broad band light source.

Figure 1:
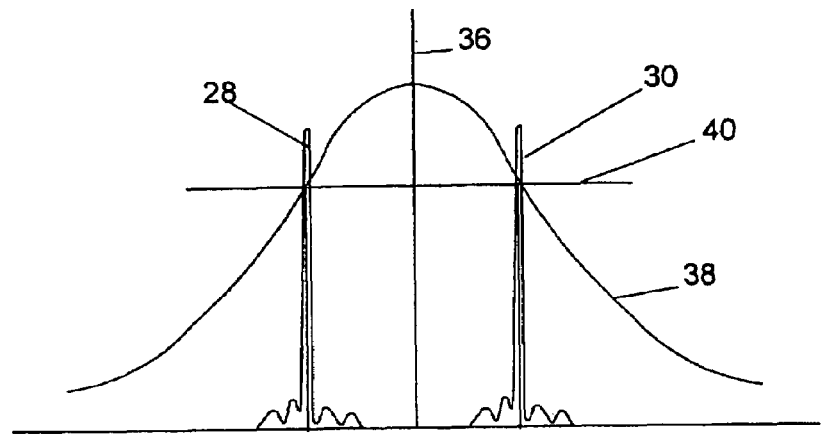
FIG. 1 is a graph illustrating the band occupied by the broad band light beam and the distribution of the narrow band filters around the central desired frequency.

Attention is first drawn to FIG. 1, showing a graph of the spectrum of a broad band light source 10 (shown in FIG. 2) in its ideal desired central position, together with the disposition of the first 28 and second 30 spectral narrow band filters thereabout.

The first 28 and second 30 spectral narrow band filters are spaced at roughly equal distances below and above the desired frequency 36 of the output 38 of the light source 10. The equidistancing does not have to be so, and the present invention can be worked with the desired frequency 36 anywhere between the frequencies of the two spectral narrow band filters 32 38. In this example of the invention, the first 28 and second 30 narrow band spectral filters are positioned approximately at the 3 db down points 40 of the output 38 of the light source 10. The first 28 and second 30 narrow band spectral filters can be at other distances from the desired central frequency 36 and need not necessarily be positioned at or near the 3 db down points 40.

Figure 2:
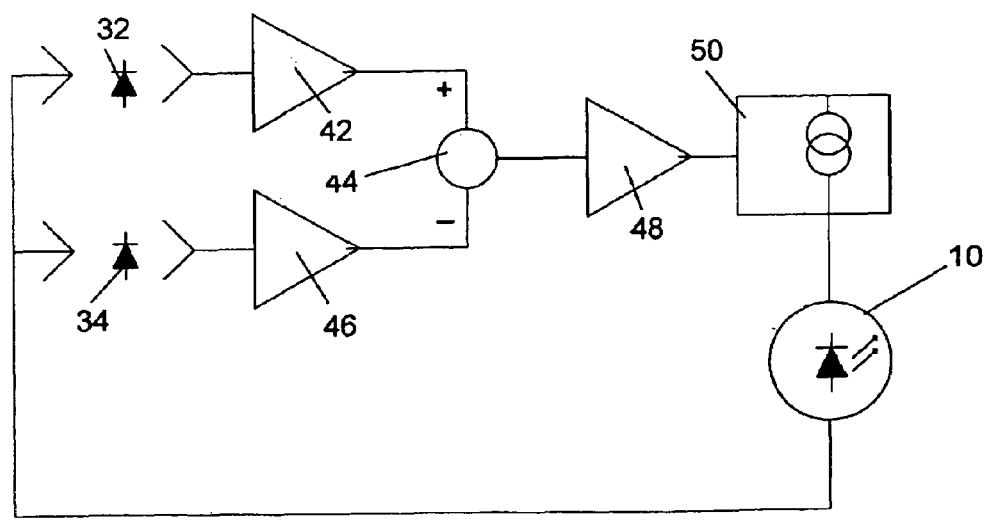
FIG. 2 is a block diagram showing a first method of employing the detected output of the two narrow band filters of FIGS. 1 and 8 to generate an error signal and a first way of altering the central frequency of the broad band light source.

Attention is next drawn to FIG. 2, showing a first way in which the outputs of a first spectral photodetector 32 and a second spectral photodetector 34 can be used to control the centre frequency of the light source 10. The first spectral photodetector 32 is coupled to a first photodetector amplifier 42 and thence to one side of a summing device or junction 44. The output of the second spectral photo detector 34 is coupled to a second photodetector amplifier 46 and thence to the other (opposite sign) side of the summing device or junction 44. The summing device or junction 44 makes the difference (amplified) between the outputs of the first 32 and second 34 spectral photodetectors and provides that output as input to a difference amplifier 48 which drives, in this example, a current source 50 for the light source 10. The feedback loop is closed by light from the light source 10 being coupled back into the first 32 and second 34 spectral photodetectors. Should the central frequency of the light source 10 drift, the difference amplifier 48 experiences an error voltage from the summing device or junction 44 which drives the amount of current provided by the current source 50 in a direction which brings the central frequency of the light source 10 back towards the desired frequency 36. The feedback loop may be provided with a compensating filter to ensure its stability, as is well-known.

Figure 3:
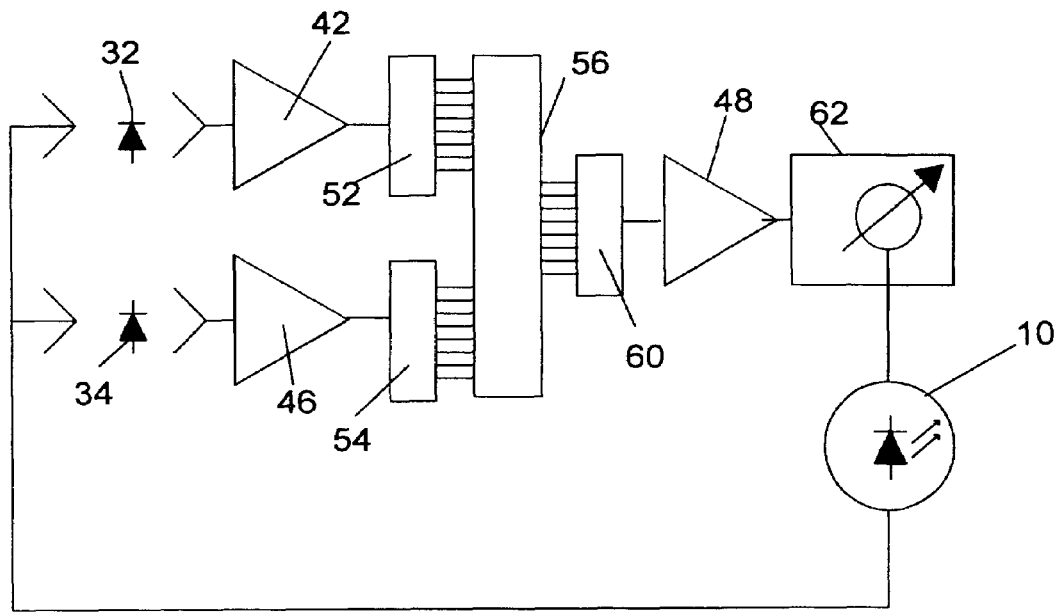
FIG. 3 is a block diagram showing a second method of employing the detected output of the two narrow band filters of FIGS. 1 and 8 to generate an error signal and a second way of altering the central frequency of the broad band light source.

Attention is next drawn to FIG. 3, showing a second way in which the outputs of the first 32 and second 34 spectral photodetectors can be employed to correct the frequency of the light source 10. Like numbers denote like items. The output of the first photodetector amplifier 42 is coupled as the analogue input to a first analogue to digital converter 52. The output of the second photodetector amplifier 46 is coupled as the analogue input to a second analogue to digital converter 54. The digital outputs of the first analogue to digital converter 52 and the second analogue to digital converter 54 are coupled as inputs to a microprocessor 56 which divides the measured size of the output of the first spectral narrow band filter 28 by the size of the measured output of the second spectral narrow band filter 30. The result of that division is provided as digital input to a digital to analogue converter 60, whose analogue output is provided to the difference amplifier 48 which, in this example, controls a voltage source 62 which controls the voltage fed to the light source 10. Whenever the light source 10 drifts away from the desired central frequency 36, the microprocessor 56 notes a change in the ratio between the amplitudes of the outputs of the first 42 and second 46 photo detector amplifiers and generates an error output which drives the difference amplifier 48 to deliver a voltage which pulls the central frequency of the light source 10 back towards the desired central frequency. The function can equally be implemented in software using analog to digital and digital to analog converters and a microprocessor, as previously indicated.

The microprocessor 56 might equally work in a step mode or in any other way in which a servo control may be implemented.

Figure 4:
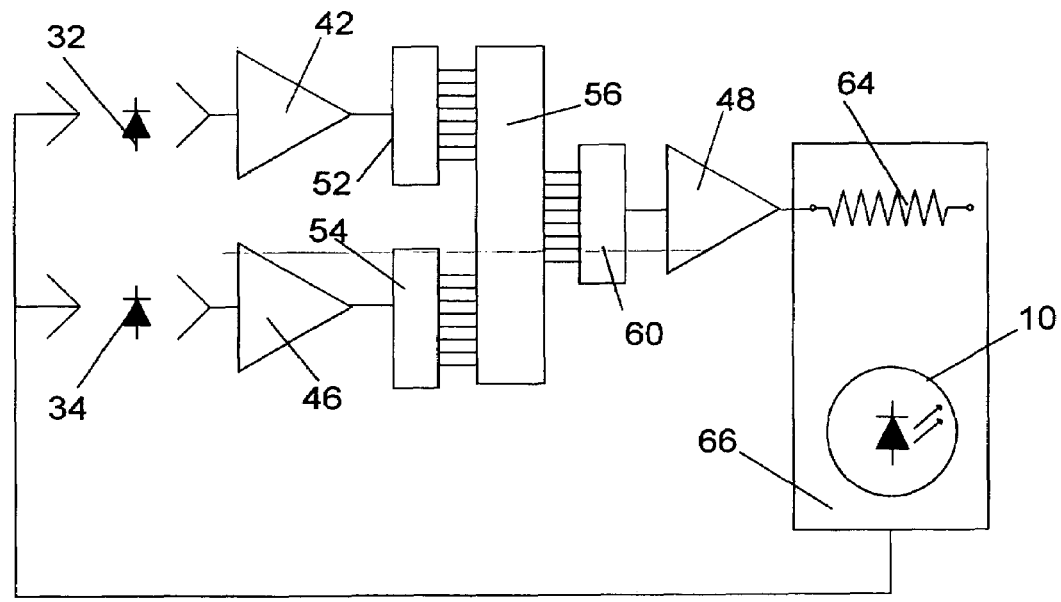
FIG. 4 is a block diagram again showing the second method of employing the detected output of the two narrow band filters of FIGS. 1 and 8 to generate an error signal and a third way of altering the central frequency of the broad band light source.

Attention is drawn to FIG. 4, which shows another way in which the light source 10 can be controlled to stay close to the desired central frequency 36. Everything is otherwise as shown in FIG. 3, with the exception that the difference amplifier 48 drives a heating element 64 within an enclosure 66 which contains the light source 10. If the enclosure is too hot, the difference amplifier 48 delivers less energy to the heating element 64 and the enclosure 66 cools down to bring the frequency of the light source 10 back towards the desired frequency 36. On the other hand, if the temperature is too low, the difference amplifier 48 provides more energy to the heating element 64 to warm up the enclosure 66 to bring the frequency of the light source 10 back towards the desired frequency 36. The heating element 64 may also be replaced with a bidirectional heat pump such as a thermoelectric device.

Furthermore, a second similar feedback loop can be used to measure the sum of the two photodiodes and adjust the current to keep the power of the light source 10 constant.

These are just two examples of the way in which the frequency controlling servo mechanism may be implemented and three examples of how the output frequency of the light source 10 can be controlled. In fact, all that is necessary is that some style of servo mechanism is present, is stable, and can control the frequency of the light source 10. The present invention envisages that there is the possibility of controlling the frequency of the light source 10 by other means such as magnetic, mechanical adjustment, and so on. Moreover, a single analog-to-digital converter, designed to measure directly the ratio between a first signal input and a second reference input voltage or current may be used in place of the two converters.

Attention is drawn to FIG. 5, showing a first apparatus which can be constructed according to the present invention. Like numbers mean like objects. For this embodiment, at least two narrowband filters are used, each spaced at opposite sides of the central frequency.

The light source 10 is modulated by a pulse generator 68 to produce pulses of light which have a very short duration and a repetition period which may be longer than the time taken for the pulse of light to travel down a fibre optic cable 14 to a sensor 16 and back to the top of the fibre optic cable 14. First and second isolators 70, 72 are provided to ensure unidirectionality of travel of light, and a polarisation scrambler 74 is provided in the line from the light source 10 to ensure that there is no bias in the polarisation of the light in the system.

A very broad band mirror 76 receives part of the light pulse generated by the light source 10 and reflects it back through a first coupler 12 to a second coupler 26. The second coupler 26 couples some of the light to a first port 78 which comprises a plurality of narrow band reflectors 80A, 80B and 80C. Each of the narrow band reflectors reflect a portion of the light that falls upon it, and allows a further portion to pass through. The narrow band reflectors 80A, 80B, 80C are thus only reflective in the part of the spectrum where they are intended to be active, and are substantially transparent otherwise. Such narrow band reflectors may be chosen to consist of fibre Bragg gratings, which feature low insertion loss, can easily be designed with well designed spectral characteristics, may be tuned to their central frequency, and are easily available commercially. A delay line 82 may precede each narrow band filter 80A, 80B, 80C. A second port 84 to the second coupler 26 contains a broad band reflector 86.

As the source 10 emits a light pulse, the first coupler 12 couples a portion of the light pulse into the optic fibre line 14 and another portion into the very broad band reflector 76. The first coupler 12 then couples the reflection from the very broad band reflector 76 into the second coupler 26 which couples a portion of the energy into the chain of narrow band reflectors 80A, 80B, 80C and into a second port 84 to be reflected by broad band reflector 86.

Figure 6:
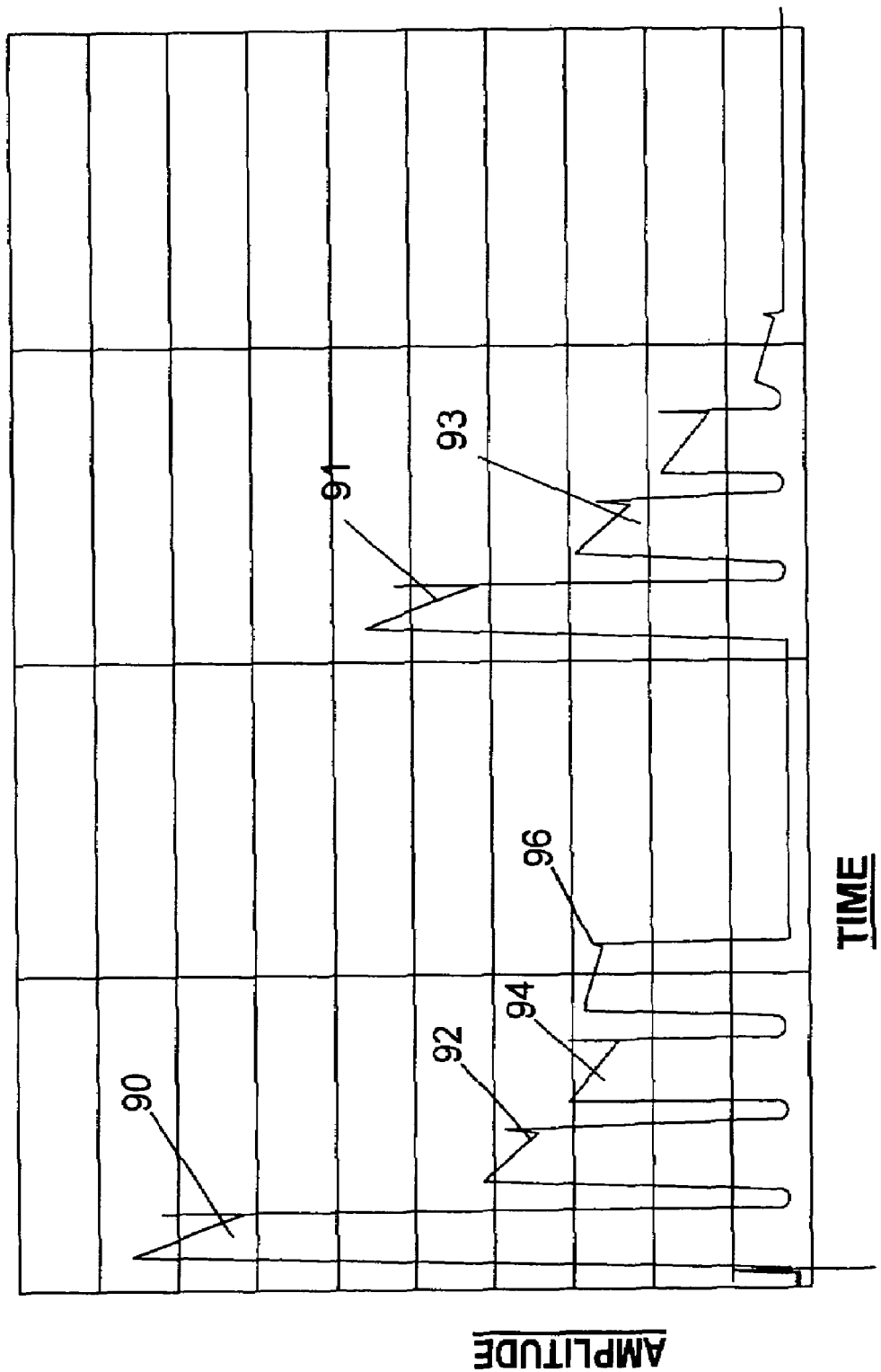
FIG. 6 is a graph showing exemplary reflected light pulses within the apparatus of FIG. 5.

Attention is also drawn to FIG. 6, which will be of assistance with the following explanation. FIG. 7 is a graph of pulses as experienced by the high speed photodetector 88.

A first group of four pulses 90 92 94 96 arise from reflection by the very broad band reflector 76 of the light pulse.

A first pulse 90, being the first to arrive at the single photo detector, is the result of the reflection from the broad band reflector 86 back through the second coupler 26. A short time later, as a result of a double traverse through the first delay line 82A, a second pulse 92 appears. This is the result of the emitted pulse from the broad band light source now bouncing off the narrow band reflector 80A back to the single photo detector. A short time after that, after a dual traverse through the first delay line 82A and the second delay line 82B, a third pulse 94 appears, which is due to reflection from the second spectral narrow band filter or reflector 80B. Likewise, a short time afterwards, a fourth pulse 96 appears which is the result of reflection from the third spectral narrow band filter or reflector 80C. A further set of pulses appears at a later time, separated by the round trip time down and up the fibre optic cable or line 14. The time scale in the centre of the graph which is FIG. 7 separating the first set of pulses 90 92 94 96 from the following set 91 93 can be in the order of fractional seconds, whereas individual pulses endure for microseconds or less. This must be taken into account when looking at FIG. 7. The second set of pulses are used for measurements of the pressure in the sensor 16 by finding the ratio of the amplitudes of the broad band pulse 91 from the transducer or sensor 16 with the amplitude of the narrow band filtered pulse 93 from the transducer or sensor 16.

Attention is drawn to FIG. 7, showing how the output of the high speed single photodetector 88 is provided as the analogue input to a high speed analogue to digital converter 98, which provides its digital output to a microprocessor 100. The microprocessor 100 separates out the instant pulses 90, 92, 94, 96 from one another by noting the greater amplitude of the first pulse 90, or by noting the time of the pulse or pulses, and counting the order of arrival or noting the time and/or sequence of the subsequent pulses 92 94 96 to establish which pulse is which. The microprocessor 100 measures the amplitude of each individual pulse 90 92 94 96 that it receives, and averages the amplitudes of the pulses from two of the spectral narrow band filters over many samples. In one embodiment, the pulses used are those reflected from filters 80A and 80C.

The microprocessor 100, provides the averaged measurements as a steady difference signal or ratio, as earlier described, on the digital input to an error digital to analogue converter 102 whose analogue output drives a difference amplifier 48 which can drive the voltage or current delivered by the pulse generator 68 driving the light source 10. Equally, the difference amplifier can drive the temperature of an enclosure as earlier indicated (alternatively including a second feedback to stabilize power, as also mentioned).

Finally, attention is drawn to FIG. 8, showing another apparatus, constructed according to the present invention, employing a broad band light source which is substantially temporally continuous.

A broad band light source 10 provides temporally continuous broad band light to a first coupler 12 which couples broad band light to an optic fibre 14, which can be very many kilometres long and can descend into a hostile environment such as an oil, gas or other hydrocarbon well. At the far end of the optic fibre 14 is an interferometric sensor 16 which is designed to measure temperature, flow rate, chemical property, pressure or strain. The sensor 16 can be similar to that used in U.S. Pat. Nos. 6,069,686 and 5,963,321.

The broad band light is returned back along the optic fibre 14 to the first coupler 12 which couples it into a beam splitter 18. The beam splitter 18 splits the broad band return beam from the sensor 16, and feeds it to measuring equipment 19, in the form of one or more sub beams 20. Each sub-beams 20 can pass through one or more filters 24 and thence on to a respective photo detectors, 22. The exact contents of the measuring equipment 19 is not of particular concern to the present invention, being one of many ways in which light, from the sensor 16, can be analysed to obtain the value of a parameter being measured by the sensor 16.

The apparatus comprises a second coupler 26 which receives a portion of the light from the broad band light source 10 via the first coupler 12. The second coupler 26 divides the light between a first spectral narrow band filter 28 and a second spectral narrow band filter 30. The light which traverses the first spectral narrow band filter 28 strikes a first spectral photodiode 32 and the light which traverses the second spectral narrow band filter 30 is measured using a second spectral photodiode 34. The output of the photodiodes 32 and 34 can then be used to stabilize the output of the light source 10.

As discussed earlier, although FIG. 6 shows three narrowband reflectors, the invention only requires that two narrowband reflectors be used, one on each side of the central frequency.

It is understood that for the embodiments of FIGS. 1 and 6, the technique, including at least two narrowband reflectors, may be used with any sensor and acquisition system, provided that the narrowband reflectors receive the light emitted by the light source.

The invention claimed is:

1. An apparatus for processing signals from a remote optic sensor, said apparatus including means for supplying a broad band light beam for use in interrogating the optic sensor, said apparatus comprising: a first narrow band filter and a second narrow band filter, said first and second narrow band filters having respective centre frequencies spaced about the desired centre frequency of the broad band light source; coupling means for coupling a first sample of said broad band light beam through said first narrow band filter and a second sample of said broad band light beam through said second narrow band filter; first means to measure the filtered first sample of said broad band light beam; second means to measure the filtered second sample of said broad band light beam; comparison means to compare the outputs of said first means and said second means and to produce an error indication in response thereto; and means to employ said error indication to apply a correction to said means to produce said broad band light beam to move the central frequency of said broad band light beam towards said desired centre frequency.

2. An apparatus, according to claim 1, wherein said first and second means to measure comprise a single measurement path and means temporally to separate measurement activity for said first filtered sample and for said second filtered sample.

3. An apparatus, according to claim 2, wherein said means to supply a broad band light beam is temporally discontinuous, wherein said first means to measure is operative to measure only when a first sample of the broad band light beam is present for measurement, and wherein said second means to measure is operative to measure only when a second sample of the broad band light beam is present for measurement.

4. An apparatus, according to claim 2 or claim 3, wherein said first narrow band filter comprises a first narrow band reflector, wherein said second narrow band filter comprises a second narrow band reflector, and wherein said first and second narrow band reflectors are separated by a delay line, operative to cause said first filtered sample and said second filtered sample temporally to be separated.

5. An apparatus according to claim 2, wherein said means for coupling said first and said second samples of said broad band light beam comprises a broadband reflector, said broadband reflector being operative to reflect a main sample of said broad band light beam to said first narrowband filter and to said second narrow band filter, said first narrow band filter being operative to reflect said main sample as said first sample of said broad band light beam, and said second narrow band filter being operative to reflect said main sample as said second sample of said broad band light beam.

6. An apparatus, according to claim 1, wherein said means to supply a broad band light beam is substantially temporally continuous, and wherein said first and second means to measure are also substantially temporally continuous.

7. An apparatus, according to claim 1, wherein said cental frequency of the broad band light beam is moveable to coincide with said desired central frequency.

8. An apparatus, according to claim 1, wherein said error signal is a difference signal.

9. An apparatus, according to claim 1, wherein said comparison means is operative to take the ratio between the output of the first means to measure and the output of the second means to measure, and to generate a corrective output error indication if the ratio changes.

10. An apparatus, according to claim 1, wherein said means to employ said error indication to apply a correction to said means to produce said broad band light beam to move the central frequency of said broad band light beam is operative to control the current through the means for supplying a broad band light beam.

11. An apparatus, according to claim 1, wherein said means to employ said error indication to apply a correction to said means to produce said broad band light beam to move the central frequency of said broad band light beam is operative to control voltage applied to the means for supplying a broad band light beam.

12. An apparatus, according to any one of claim 1, wherein said means to employ said error indication to apply a correction to said means to produce said broad band light beam to move the central frequency of said broad band light is operative to control the temperature of the means for supplying a broad band light beam.

13. An apparatus, according to claim 1, wherein said broad band light beam provides illumination for an optical sensor on the distal end of a fibre optic line in a hydrocarbon well.

14. An apparatus, according to claim 13, wherein said optical sensor is one of, a pressure sensor, a flow rate sensor, a temperature sensor, a chemical property sensor, and a strain sensor.

15. A method for stabilizing a broad band light source in a system used for processing signals from a remote optic sensor, said method including the steps of: supplying a broad band light beam for use in interrogating the optic sensor; providing a first narrow band filter and a second narrow band filter, said first and second filters having respective centre frequencies spaced about the desired centre frequency of the broad band light source; coupling a first sample of said broad band light beam via said first narrow band filter and a second sample of said broad band light beam via said second narrow band filter; measuring the filtered first sample of said broad band light beam; measuring the filtered second sample of said broad band light beam; comparing the outputs of said first sample and said second sample; producing an error indication in response thereto; and moving the central frequency of the broad band light beam towards the desired centre frequency as a result of the error indication.

16. A method, according to claim 15, including the steps of providing a single measurement path for said first and second means to measure, and temporally separating measurement activity for said first filtered sample and for said second filtered sample.

17. A method, according to claim 16, including the steps of: supplying said broad band light beam in a temporally discontinuous manner; operating said first means to measure only when a first sample of the broad band light beam is present for measurement; and operating said second means to measure only when a second sample of the broad band light beam is present for measurement.

18. A method, according to claim 15 or claim 16 for use where said first narrow band filter comprises a first narrow band reflector, where said second narrow band filter comprises a second narrow band reflector, and where said first and second narrow band reflectors are separated by a delay line, operative to cause said first filtered sample and said second filtered sample temporally to be separated.

19. A method, according to claim 16, including the steps of: employing a broadband reflector to reflect a main sample of said broad band light beam to said first narrowband filter and to said second narrow band filter; reflecting said main sample from said first narrow band filter as said first sample of said broad band light beam; and reflecting said main sample from said second narrow band filter as said second sample of said broad band light beam.

20. A method, according to claim 15, including the steps of: supplying said broad band light beam in a substantially temporally continuous manner; and operating said first and second means to measure in a substantially temporally continuous manner.

21. A method, according to claim 15, including the step of moving said cental frequency of the broad band light beam to coincide with said desired central frequency.

22. A method, according to claim 15, wherein said error signal is a difference signal.

23. A method, according to claim 15, wherein said step of producing an error indication includes the steps of: taking the ratio between the output of the first means to measure and the output of the second means to measure; and generating a corrective output error indication if the ratio changes.

24. A method, according to claim 15, wherein said step of moving the central frequency of the broad band light beam towards the desired centre frequency as a result of the error indication includes the step of controlling the current through the means for supplying a broad band light beam.

25. A method, according to claim 15, wherein said step of moving the central frequency of the broad band light beam towards the desired centre frequency as a result of the error indication includes the step of controlling voltage applied to the means for supplying a broad band light beam.

26. A method, according to claim 15, wherein said step of moving the central frequency of the broad band light beam towards the desired centre frequency as a result of the error indication includes the step of controlling the temperature of the means for supplying a broad band light beam.

27. A method, according to claim 15, including the step of employing said broad band light beam to provide illumination for an optical sensor on the distal end of a fibre optic line in a hydrocarbon well.

28. A method, according to claim 27, wherein said optical sensor is one of, a pressure sensor, a flow rate sensor, a temperature sensor, a chemical property sensor, and a strain sensor.

* * * * *